United States Patent [19]

Thornton

[11] Patent Number: 4,615,158
[45] Date of Patent: Oct. 7, 1986

[54] MOBILE HOME TORNADO SHELTER

[76] Inventor: Sandra K. Thornton, 215 E. Grimes St., Polk City, Iowa 50226

[21] Appl. No.: 813,856

[22] Filed: Dec. 27, 1985

[51] Int. Cl.$^4$ .............................................. E02D 29/00
[52] U.S. Cl. ..................................... 52/169.6; 52/182; 52/169.12; 52/DIG. 3; 52/20; 109/1 S
[58] Field of Search .......... 52/169.6, 169.12, DIG. 3, 52/182, 19, 20, 21; 109/1 S

[56] References Cited

U.S. PATENT DOCUMENTS

| | | | |
|---|---|---|---|
| 951,192 | 3/1910 | Massey | 52/20 |
| 991,085 | 5/1911 | Potter | 52/20 |
| 1,158,894 | 11/1915 | Christofferson et al. | 52/20 |
| 2,936,504 | 5/1960 | Harris | 109/1 S |
| 2,961,255 | 11/1960 | Trott . | |
| 3,093,097 | 6/1963 | Rosenfeld . | |
| 3,196,813 | 7/1965 | McHugh, Jr. | 109/1 S |
| 3,232,022 | 2/1964 | Rosenfeld . | |
| 3,710,525 | 1/1973 | Lopes . | |
| 4,010,963 | 3/1977 | Prentice . | |
| 4,107,888 | 8/1978 | Krueger . | |
| 4,126,972 | 11/1978 | Silen . | |

FOREIGN PATENT DOCUMENTS

| | | | |
|---|---|---|---|
| 3413055 | 11/1984 | Fed. Rep. of Germany | 52/20 |
| 526019 | 9/1940 | United Kingdom | 52/169.6 |
| 2111555A | 7/1983 | United Kingdom | 52/169.6 |
| 1004537 | 3/1983 | U.S.S.R. | 52/169.6 |

*Primary Examiner*—John E. Murtagh
*Assistant Examiner*—Caroline Dennison
*Attorney, Agent, or Firm*—Zarley, McKee, Thomte, Voorhees & Sease

[57] ABSTRACT

A tornado shelter, specially adapted for use with mobile home lots. The shelter is an underground enclosure defined by an annular sidewall and a top and bottom. The top of the enclosure has an entrance and egress passageway in communication with both the enclosure and the bottom of a mobile home. The passageway is surrounded by a flexible sidewall which is moveably attached to the top of the underground disclosure and the bottom of the mobile home. An associated collapsible stepladder allows convenient and egress. When the mobile home unit is moved, the passageway sidewall may be removed, and the shelter sealed until a new unit is moved in place.

8 Claims, 7 Drawing Figures

U.S. Patent  Oct. 7, 1986  Sheet 2 of 2  4,615,158
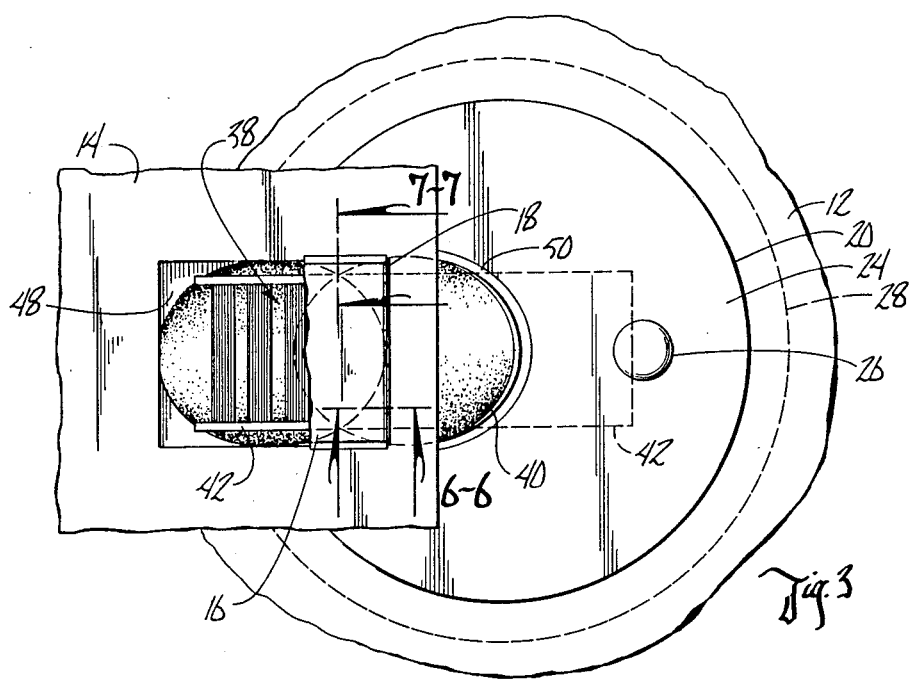
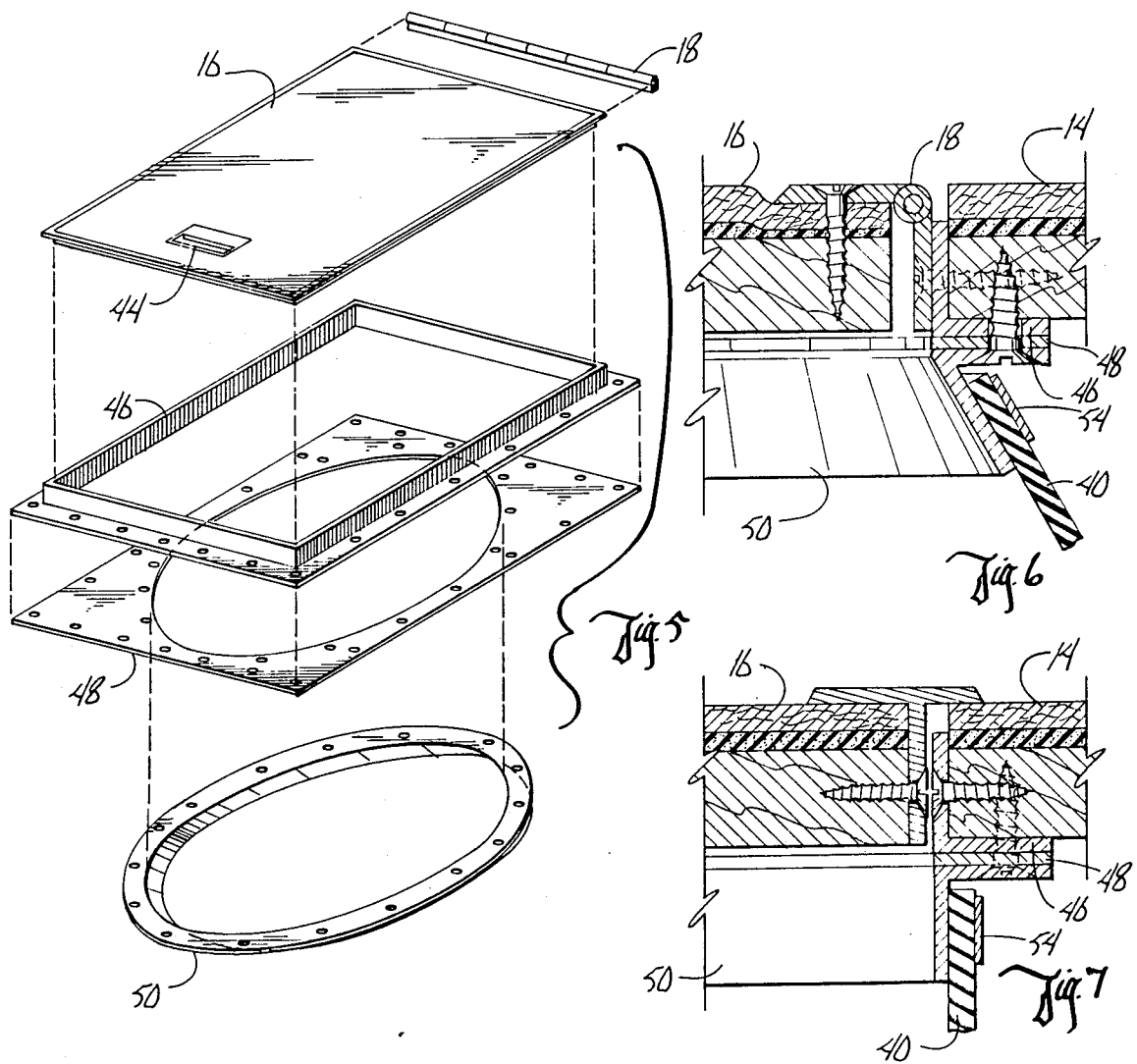

MOBILE HOME TORNADO SHELTER

BACKGROUND OF THE INVENTION

This invention relates to a continuing problem in areas of the country exposed to tornadoes, especially during the spring and fall. Those persons in highest risk during the tornado season are people living in mobile homes. Typically this is because mobile homes have no cellar for use as a shelter, and the home itself is highly susceptible to damage by a tornado. There is, therefore, a continuing need for the improvement of mobile homes and lots for the same, such that mobile home users can have the same safety as owners of fixed homes with cellar storm shelters. This invention has as its primary objective the fulfillment of this need.

While heretofore there have been some shelters useable for mobile homes, such have had limited success, primarily because of their expense in building, difficulty in use with mobile home lots where there is a continuing turnover rate of the homes using any particular lot, and where there are numerous freeze-thaw cycles coupled with drastic changes in ground water level during the seasons.

The mobile home tornado shelter of the present invention is functionally easy to use, safe, economical in building, can be conveniently capped over when a trailer lot is vacant, and is adequately anchored to the ground to prevent damage by freeze-thaw cycles and prevent uplifting during times of high ground water.

SUMMARY OF THE INVENTION

A mobile home tornado shelter, which makes use of an underground annular disclosure defined by steel sidewalls, with the enclosure having a vent, a top and a bottom. The top of the enclosure has a passageway in communication with the bottom floor of a mobile home and thus provides access to the interior. The passageway is surrounded by a flexible sidewall which is removably attached to both the mobile home and the entrance to the underground shelter. The shelter itself has a stepladder which is collapsible to allow entrance and egress from the mobile home. When the lot is vacant, the shelter may be easily unlocked from the trailer and sealed off. The shelter itself is anchored in the ground to prevent damage from freeze-thaw cycles and to prevent uplifting during periods of high ground water.

BRIEF DESCRIPTION OF THE DRAWINGS

FIG. 3 shows a plan view of the shelter, with certain parts broken away.

FIG. 5 shows an exploded view of the sealing arrangement between the shelter passageway and the floor of a mobile home.

FIG. 6 shows a view along line 6—6 of the attachment between the mobile home and the passageway into the underground enclosure.

FIG. 7 shows a sectional view of the same attachment along line 7—7 of FIG. 3.

DETAILED DESCRIPTION OF THE INVENTION

Figures 1, 2, 4:
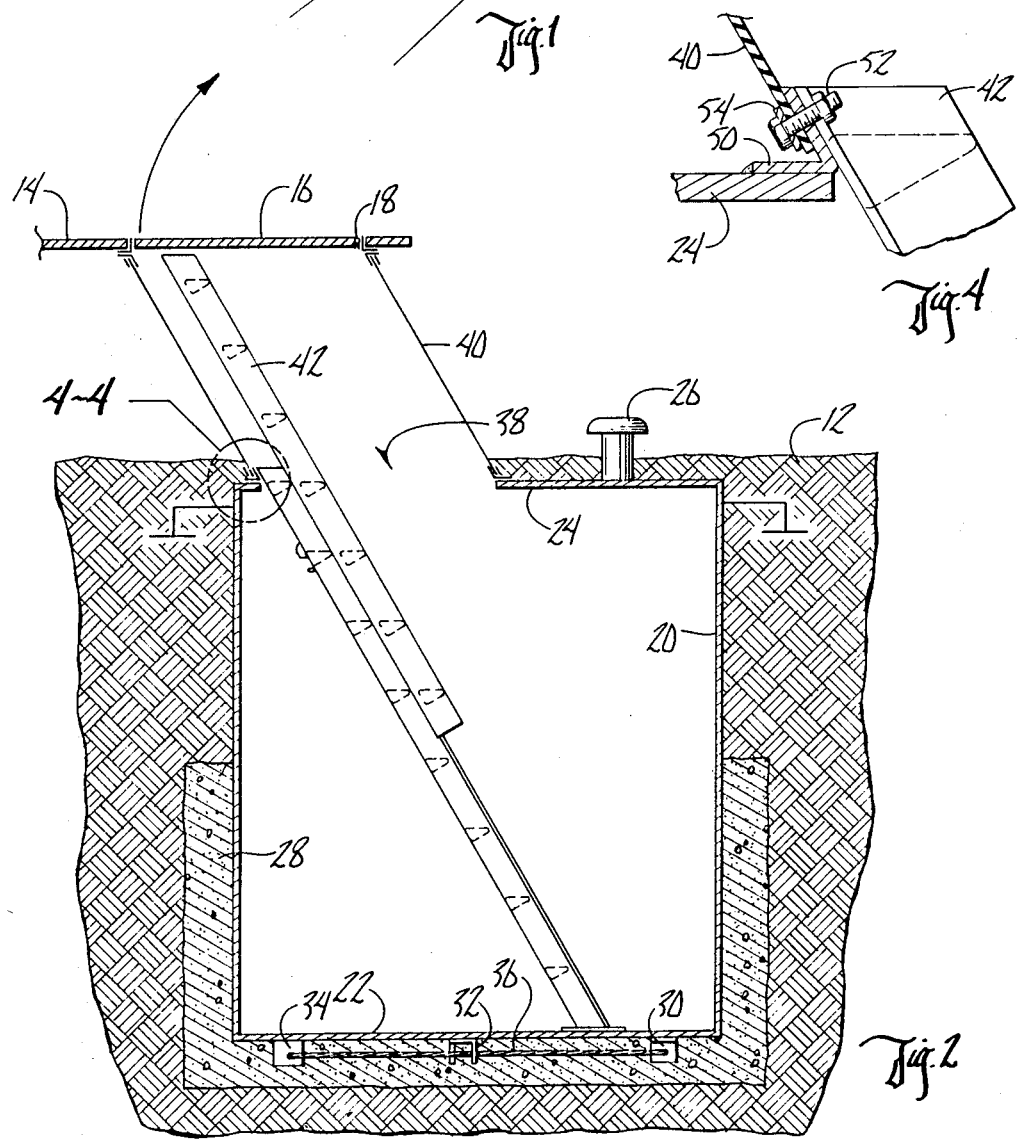
FIG. 1 shows a mobile home, with parts broken away, in association with the tornado shelter of the present invention.
FIG. 2 shows an elevated view in section along line 2—2 of the tornado shelter.
FIG. 4 shows an exploded view of the hinge along line 4—4 of FIG. 2.

With continuing reference to FIGS. 1 and 2, there is shown in FIG. 1 a mobile home, generally designated as 10. Mobile home 10 is associated with a tornado shelter positioned in the ground 12, such that it may be used in association with the floor 14 of the trailer 10. Floor 14 of mobile home 10 has an associated door 16 and hinge 18.

The tornado shelter is comprised of an annular or cylindrical walled enclosure defined by annular wall 20, in association with bottom 22 and top 24. Top 24 has an exterior vent 26, vented to the outside. The underground enclosure, defined by annular wall 20, bottom 22 and top 24 is anchored into the ground 20 in a manner best depicted in FIG. 2. The enclosure is positioned in a concrete foundation 28. Bottom 22 has downwardly extending, spaced apart brackets 30, 32 and 34, and anchor cable 36 anchors the enclosure into the ground 20. In this manner the tank or vessel defined by annular wall 20, top 24 and bottom 22 is successfully anchored to the ground, and is prevented from damage by freeze-thaw cycles and importantly will not rise out of the ground during periods of high water level when the same has a tendency to be buoyed upward and out of the ground by the same.

Top 24 has a passageway 38 to allow ingress and egress from the underground enclosure or shelter. As seen generally in FIG. 2 and with more particularity in FIG. 3, passageway 38 is surrounded by a removably attached flexible side wall grommet 40. Grommet 40 may be made from any weather-proofed rubberized material. It functions as a removable sealing gasket to protect from exterior environmental hazzards, both the shelter and the bottom floor 14 of the mobile home. Associated with both the floor 14 of the mobile home and the underground enclosure is a collapsible stepladder 42.

With continuing reference to FIGS. 5, 6 and 7, one can see how the grommet is in sealing relationship with both the underground tank (not specifically depicted with a numeral) and the floor 14 of the mobile home. Door 16 has a handle 44. Opening of door 16 shows an associated floor plate 46, and gasket plate 48 and passageway angle iron 50. As best depicted in FIG. 4, angle iron 50 attaches the top 24 of the enclosure tank via bolt 52 to a band 54 and ladder 42, adjacent at the top. Ladder 42 is of conventional construction and may be pulled up when not needed to climb down into the underground shelter.

In actual operation the unit works as follows. During a period when a tornado warning is given, floor door 16 is opened up, ladder 42 is extended, and the users climb down into the shelter, closing floor door 16 behind them. Grommet 40 provides for a sealing relationship between the mobile home and the tank. Ladder 42 may be raised during use, if desired. When the mobile home is moved, grommet band 54 may be opened, the grommet removed and a lid placed over passageway 38. In this way it can be seen that a safe and effective shelter is provided. Moreover, freeze-thaw cycles and ground water buoyancy tending to push the tank out are countered by the exterior tank foundation 28 and the anchor system by brackets 30, 32, and 34, and anchor cable 36. It thus can be seen that all of the stated objectives of the invention are accomplished.

What is claimed is:

1. A mobile home tornado shelter, comprising:

an underground enclosure defined by sidewalls, a top and bottom;

said top of said enclosure having an entrance and egress passageway in communication with said enclosure and the interior of a mobile home;

said passageway having a flexible sidewall which is removably attached to said underground enclosure and said mobile home; and step means associated with said enclosure and said mobile home to allow easy user access from said trailer to said underground enclosure.

2. The shelter of claim 1 wherein said sidewalls of said enclosure are formed of a steel cylinder.

3. The shelter of claim 2 wherein said cylinder is anchored to the surrounding soil to prevent said tank from being pushed upward out of the ground during times of high ground water.

4. The shelter of claim 3 wherein said cylinder is anchored into a concrete foundation.

5. The shelter of claim 1 wherein said step means is a collapsible ladder, operatively connected to said mobile home so it may be raised and lowered therefrom.

6. The shelter of claim 1 wherein said passageway flexible sidewall is a weatherproof rubberized grommet.

7. The shelter of claim 1 wherein said mobile home has a floor trap door which may be open to reveal said passageway.

8. The shelter of claim 1 which has an air vent to the outdoors.

* * * * *